(12) United States Patent
Fiedler et al.

(10) Patent No.: US 10,179,548 B2
(45) Date of Patent: Jan. 15, 2019

(54) CLOSURE DEVICE FOR FASTENING AN OBJECT TO A CARRIER ELEMENT AND FASTENER FOR FASTENING AN OBJECT TO A CARRIER ELEMENT

(71) Applicant: Fidlock GmbH, Hannover (DE)

(72) Inventors: Joachim Fiedler, Hannover (DE); Friedemann Richter, Hannover (DE); Breido Botkus, Hannover (DE)

(73) Assignee: Fidlock GmbH, Hannover (DE)

( * ) Notice: Subject to any disclaimer, the term of this patent is extended or adjusted under 35 U.S.C. 154(b) by 346 days.

(21) Appl. No.: 15/238,080

(22) Filed: Aug. 16, 2016

(65) Prior Publication Data

US 2017/0057420 A1    Mar. 2, 2017

(30) Foreign Application Priority Data

Aug. 25, 2015 (DE) .................. 10 2015 216 242

(51) Int. Cl.
*B60R 11/00* (2006.01)
*F16B 9/02* (2006.01)
(Continued)

(52) U.S. Cl.
CPC .............. *B60R 11/00* (2013.01); *F16B 1/00* (2013.01); *F16B 9/026* (2013.01); *F16B 21/02* (2013.01);
(Continued)

(58) Field of Classification Search
CPC .... B60R 11/00; B60R 2011/0057; F16B 1/00; F16B 9/026; F16B 21/02; F16B 39/32;
(Continued)

(56) References Cited

U.S. PATENT DOCUMENTS 3,594,876 A * 7/1971 Gunther ................. F16B 21/04
411/555
4,359,256 A * 11/1982 Gallusser ............. H01R 13/623
439/314
(Continued)

FOREIGN PATENT DOCUMENTS

DE     3426574 A1    1/1986
DE     20004567 U1   7/2000
(Continued)

*Primary Examiner* — Peter Helvey
(74) *Attorney, Agent, or Firm* — The Webb Law Firm

(57) ABSTRACT

A closure device for fastening an object, for example an electronic instrument, to a carrier element includes a first closure part and a magnet device which acts in a magnetically attracting manner between the first closure part and the second closure part. At least one thread is arranged on one of the connection portions and at least one engagement element is arranged on the other of the connection portions. The connection portions are screw-connectable together by rotation with respect to one another as a result of the at least one engagement element running onto the at least one thread. The first closure part includes at least one first anti-rotation portion and the second closure part includes at least one second anti-rotation portion. The at least one first anti-rotation portion and the at least one second anti-rotation portion (33) are non-rotatably connected together when the connection portions are screw-connected, and at least one of the connection portions of one closure part is rotatable relative to the anti-rotation portion of the closure part.

20 Claims, 14 Drawing Sheets

(51) Int. Cl.
*F16M 11/16* (2006.01)
*F16M 13/00* (2006.01)
*F16M 13/02* (2006.01)
*F16B 21/02* (2006.01)
*F16B 39/32* (2006.01)
*F16B 1/00* (2006.01)

(52) U.S. Cl.
CPC ............ *F16M 11/16* (2013.01); *F16M 13/00* (2013.01); *F16M 13/02* (2013.01); *B60R 2011/0057* (2013.01); *F16B 39/32* (2013.01); *F16B 2001/0035* (2013.01)

(58) Field of Classification Search
CPC . F16B 2001/0035; F16M 11/16; F16M 13/00; F16M 13/02
USPC ........................................................... 224/420
See application file for complete search history.

(56) References Cited

U.S. PATENT DOCUMENTS

| | | | |
|---|---|---|---|
| 4,993,575 A | 2/1991 | Maes | |
| 7,748,089 B2* | 7/2010 | Jalbert | F16B 5/0657 24/297 |
| 2002/0131843 A1* | 9/2002 | Chen-Chi | F16B 37/125 411/418 |
| 2007/0034595 A1* | 2/2007 | Foster | B65D 50/043 215/330 |
| 2008/0047111 A1* | 2/2008 | Garber | A44C 5/2061 24/303 |
| 2009/0067921 A1 | 3/2009 | Ito et al. | |
| 2009/0190993 A1* | 7/2009 | De Gelis | F16B 5/0233 403/47 |
| 2009/0238659 A1* | 9/2009 | Zoeller | F16B 21/04 411/508 |
| 2010/0263173 A1* | 10/2010 | Clarke | A41F 1/002 24/303 |
| 2010/0283269 A1* | 11/2010 | Fiedler | A44B 11/258 292/251.5 |
| 2010/0308605 A1* | 12/2010 | Fiedler | A45C 13/1069 292/251.5 |
| 2011/0030174 A1 | 2/2011 | Fiedler | |
| 2013/0000084 A1 | 1/2013 | Nassar | |
| 2013/0017014 A1 | 1/2013 | Wandelt | |
| 2013/0327912 A1 | 12/2013 | Yoshida et al. | |
| 2016/0010371 A1 | 1/2016 | Fiedler | |
| 2016/0183642 A1 | 6/2016 | Fiedler | |

FOREIGN PATENT DOCUMENTS

| | | |
|---|---|---|
| DE | 102012011848 A1 | 1/2013 |
| DE | 102012222344 A1 | 6/2014 |
| DE | 102013213633 A1 | 1/2015 |
| EP | 0170042 B1 | 10/1989 |
| EP | 0403322 A1 | 12/1990 |
| EP | 1970574 A2 | 9/2008 |
| WO | 9218028 A1 | 10/1992 |
| WO | 2009127196 A2 | 10/2009 |
| WO | 2013160607 A1 | 10/2013 |

* cited by examiner

FIG 1B
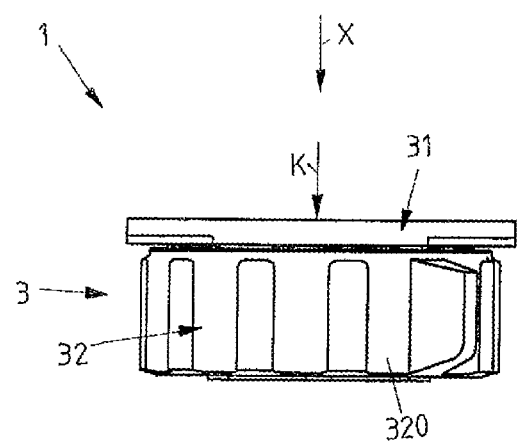
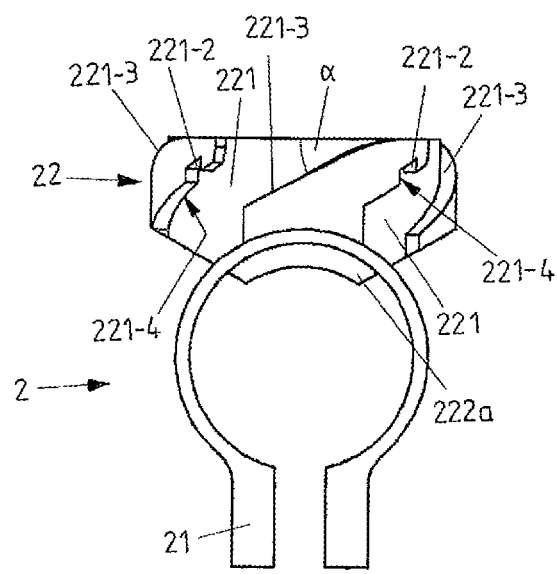

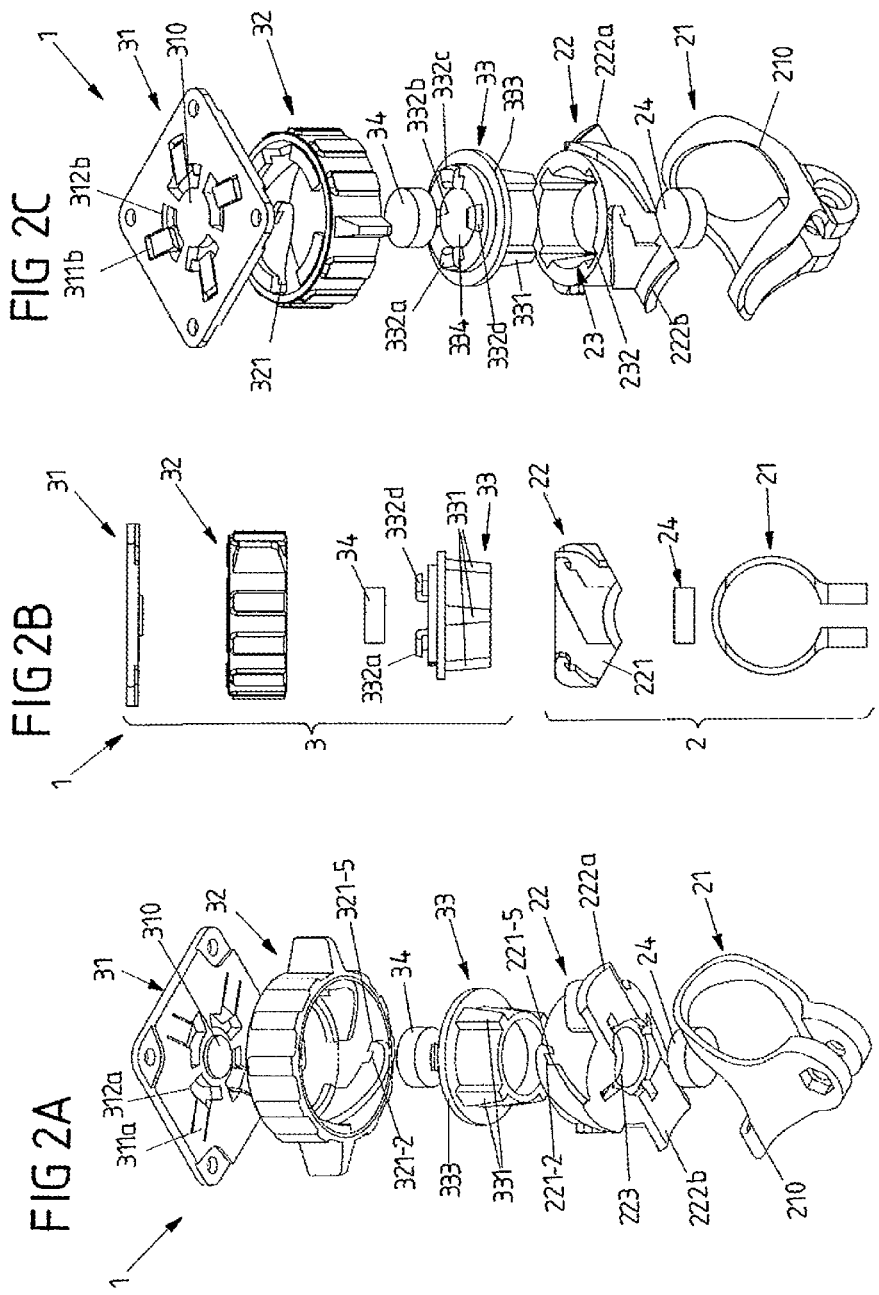

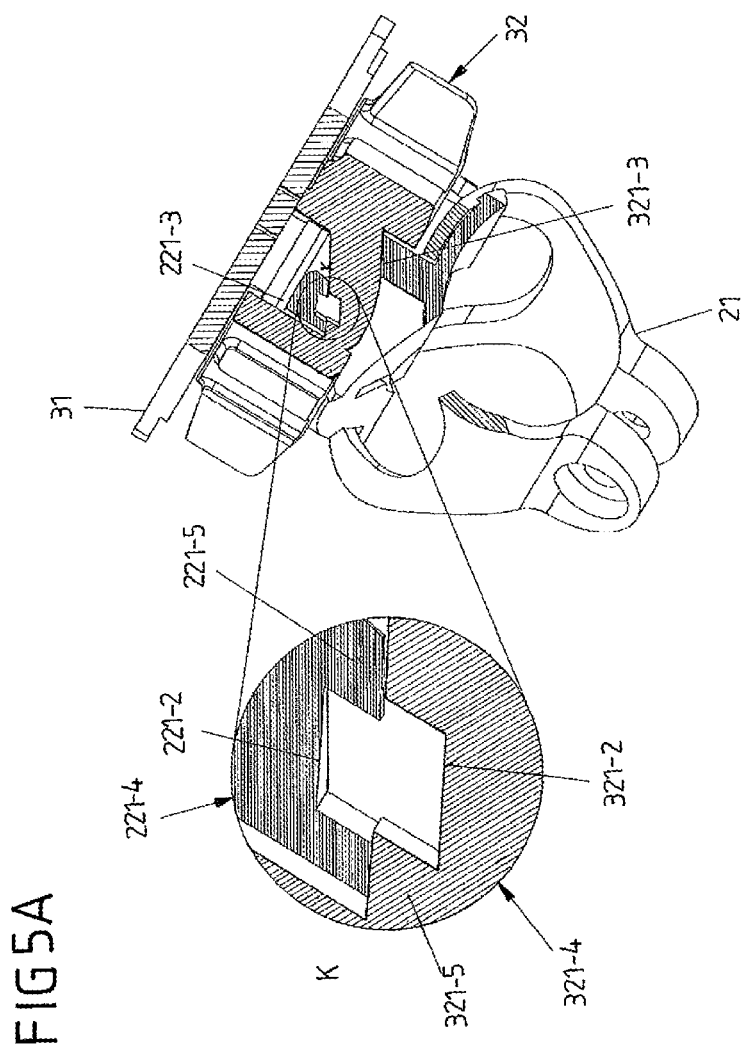

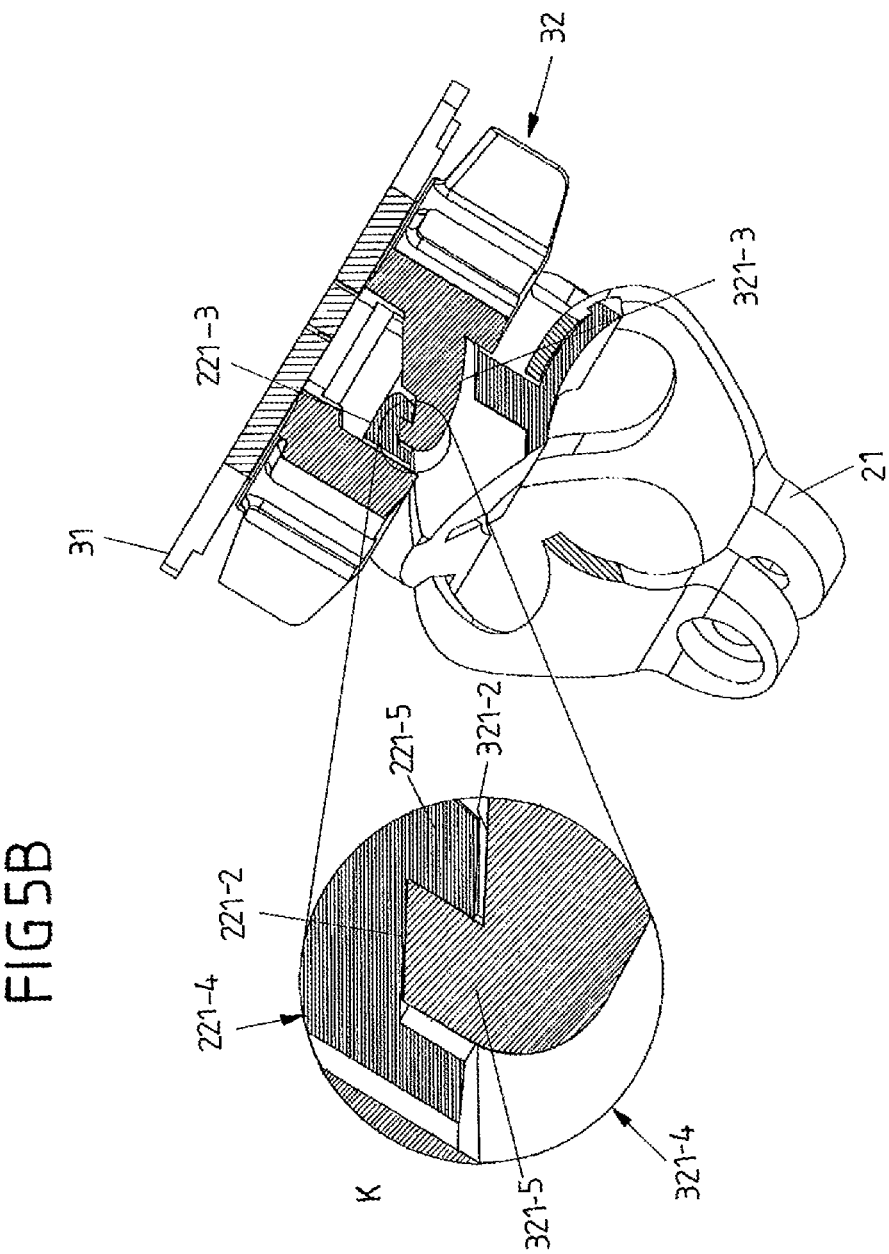

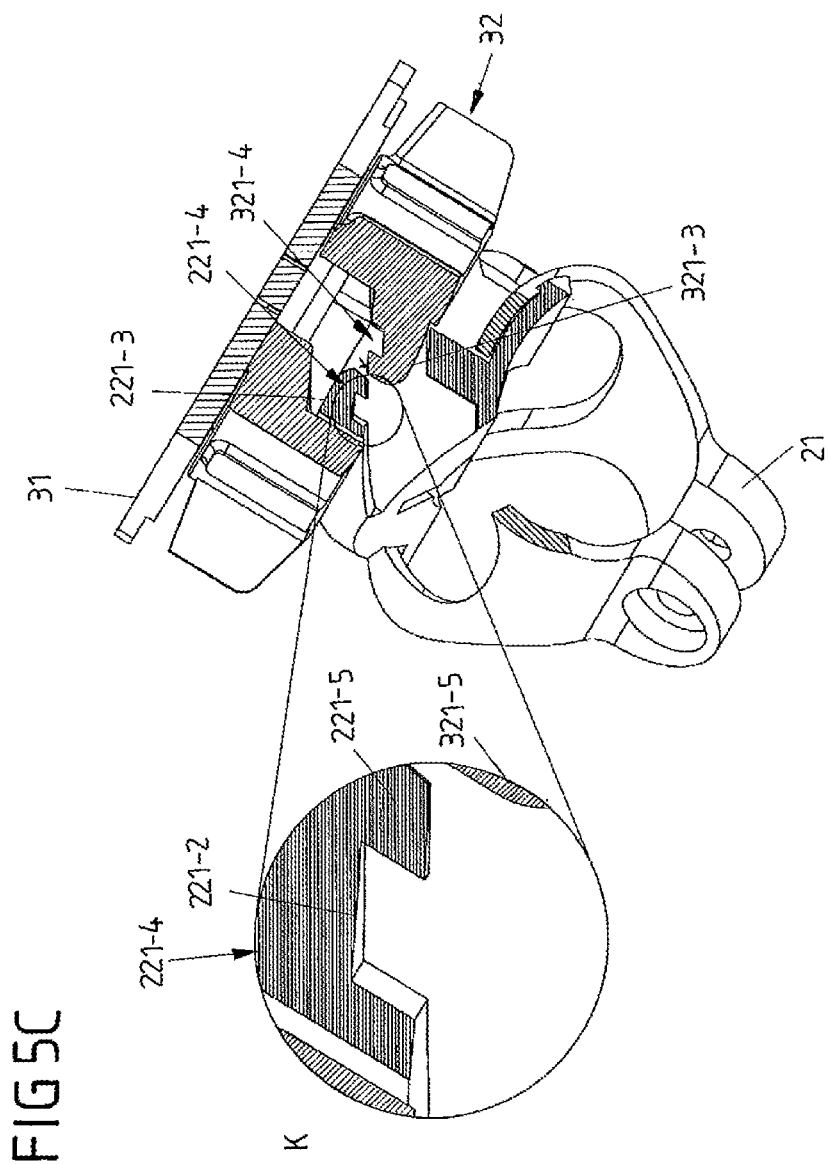

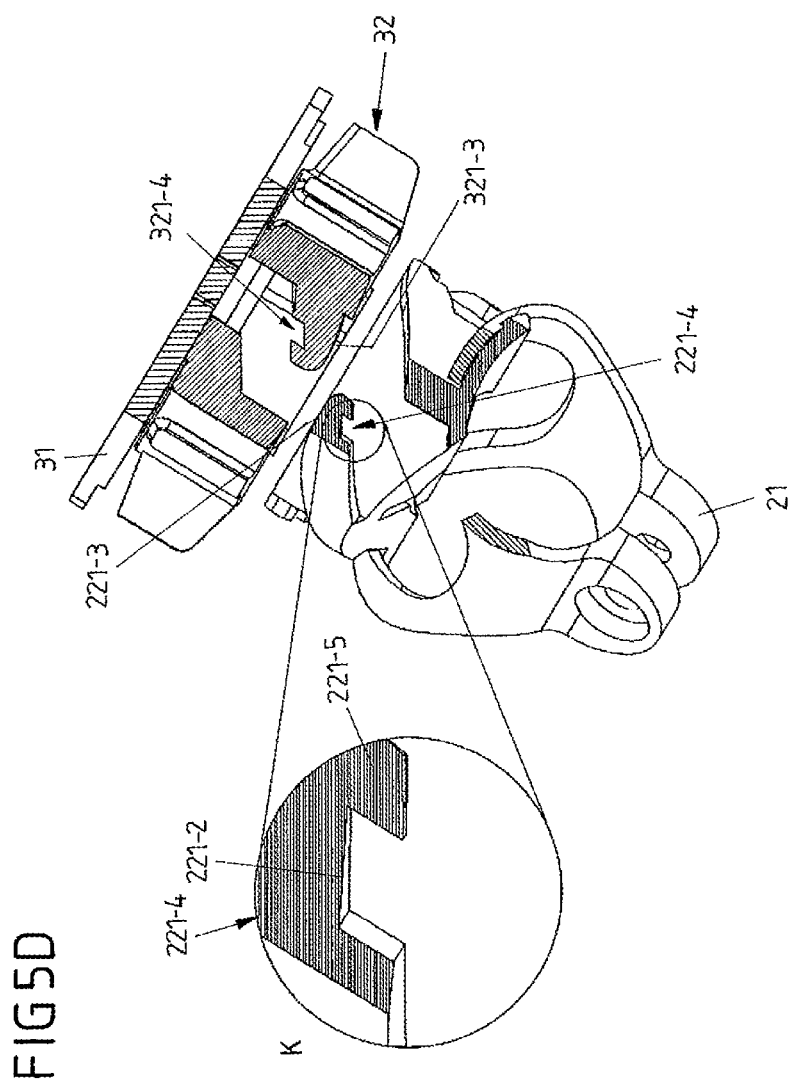

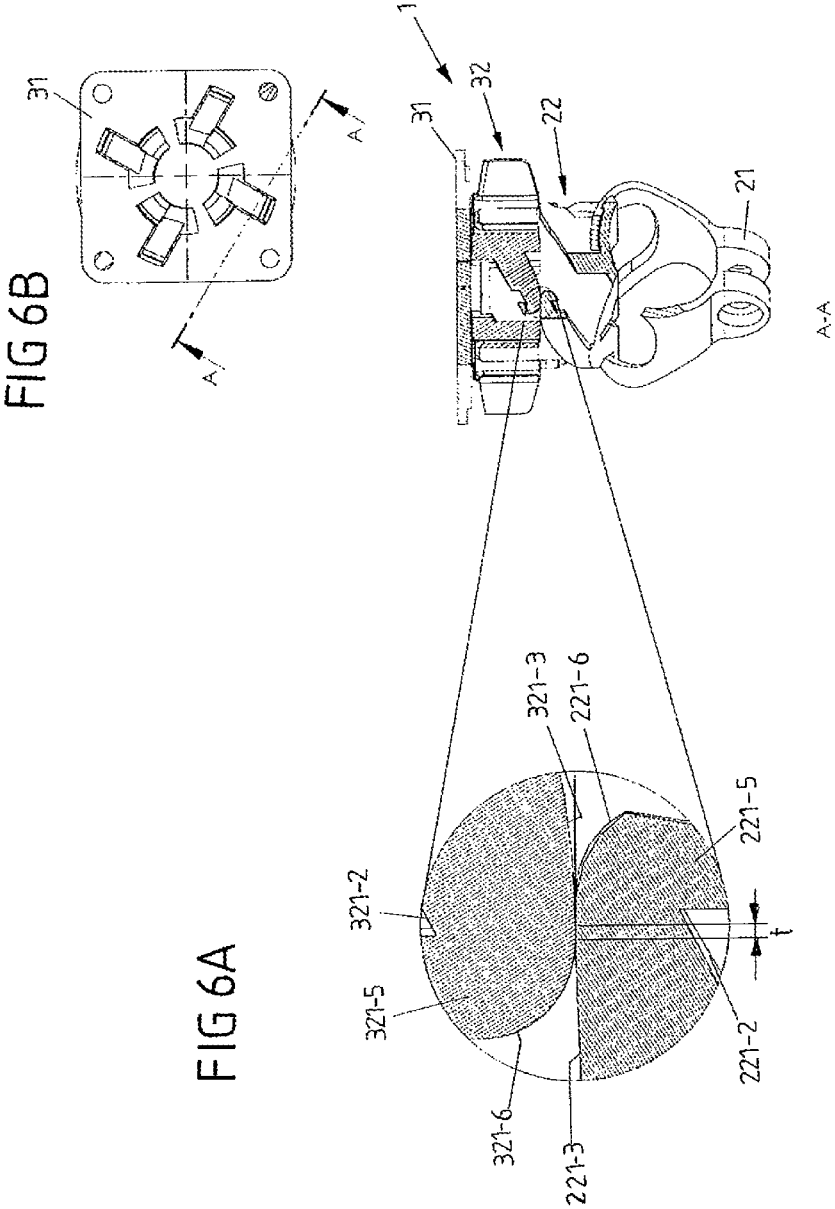

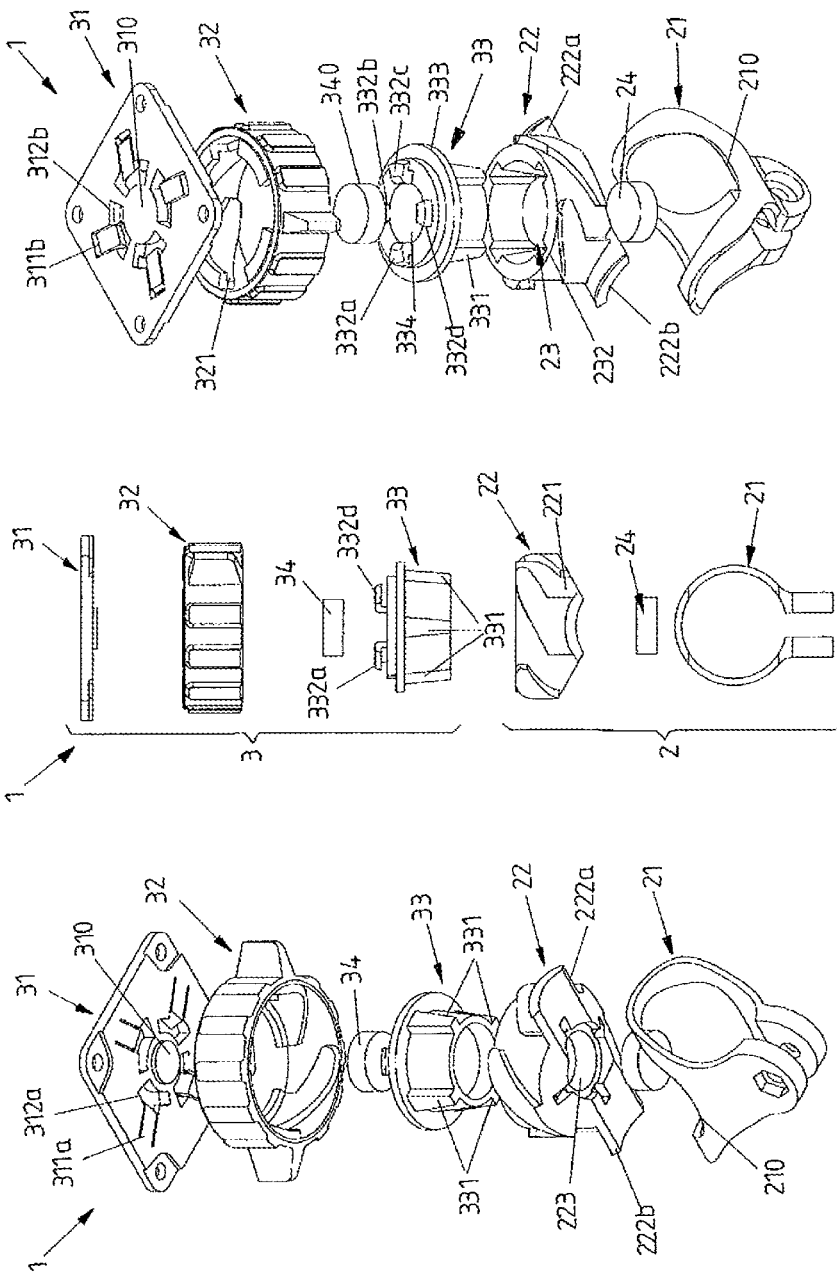

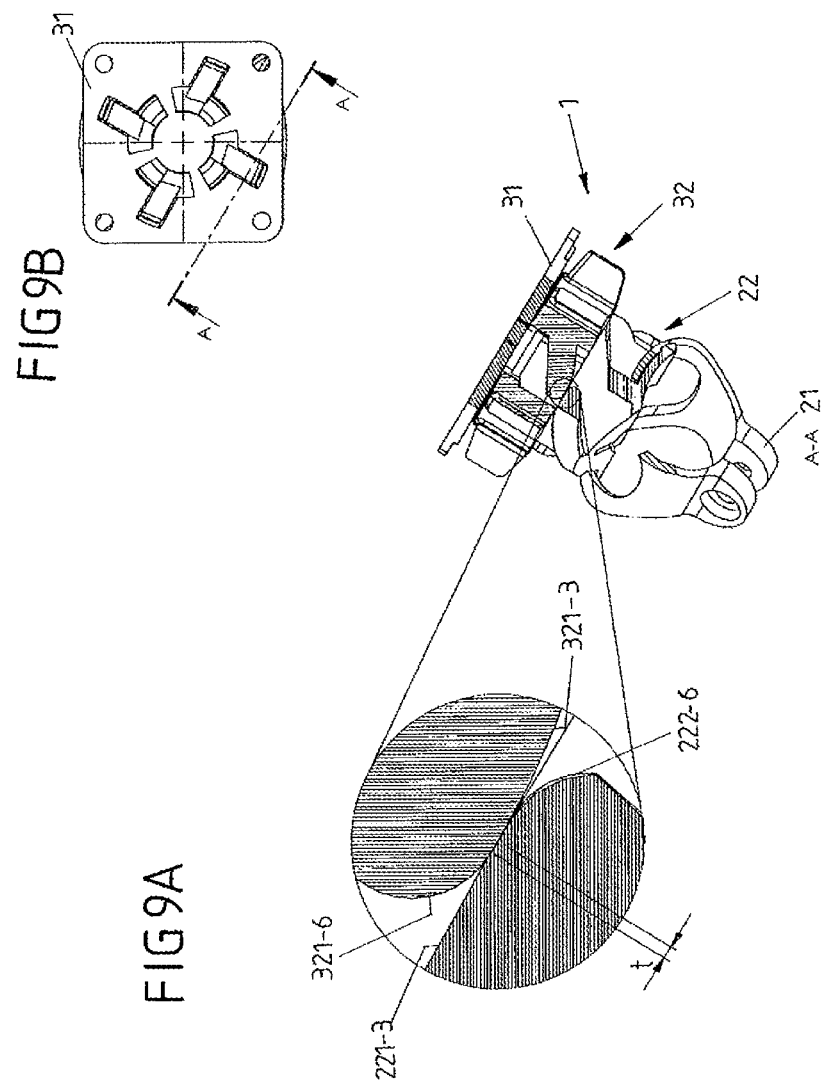

CLOSURE DEVICE FOR FASTENING AN OBJECT TO A CARRIER ELEMENT AND FASTENER FOR FASTENING AN OBJECT TO A CARRIER ELEMENT

CROSS-REFERENCE TO THE RELATED APPLICATION

This application claims priority to German Patent Application No. 10 2015 216 242.7 filed Aug. 25, 2015, the disclosure of which is hereby incorporated in its entirety.

BACKGROUND

The invention relates to a closure device and to a fastener for fastening an object to a two-wheeler or three-wheeler, in particular to a handlebar fastener which includes such a closure device.

Such a closure device serves in particular for fastening an electronic instrument to a carrier element. For example, a mobile instrument, in particular a smart phone, or another type of communication instrument, for example a navigation instrument or the like, is able to be secured to a carrier element, for example to a bicycle handlebar or the like, by means of such a closure device.

Such a closure device includes a first closure part which comprises a first connection portion, a second closure part which comprises a second connection portion and is mountable onto the first closing element in a closing direction, and a magnet device which, when the closure parts are placed together, acts in a magnetically attracting manner between the first closure part and the second closure part. At least one thread is arranged on one of the connection portions and at least one engagement element is arranged on the other of the connection portions, wherein the connection portions are screw-connectable by rotation with respect to one another around the closing direction as a result of the at least one engagement element running onto the at least one thread.

In the case of these types of closure devices, the problem frequently arises that to screw-connect the first connection portion and the second connection portion together, the first closure part has to be rotated about the closing direction as an entire unit relative to the second connection part as an entire unit. To secure an object on one of the closure parts in a defined or desired position with reference to a carrier element on which an object is to be held and to which the other of the closure parts is fastened, it can, however, be desirable to prevent rotation of the one closure part as a unit in relation to the other closure part as a unit when the connection portions are screw-connected together.

SUMMARY

It is an object of the present invention, consequently, to provide a closure device which enables an object to be fastened to a carrier element, for example to a bicycle handlebar, in a simple, favorable and mechanically robust manner in a defined or desired position.

Said object is achieved by a closure device with the features as described herein.

Accordingly, the first closure part additionally includes at least one first anti-rotation portion and the second closure part additionally includes at least one second anti-rotation portion. In this case, the at least one first anti-rotation portion and the at least one second anti-rotation portion are non-rotatably connected together when the connection portions are screw-connected, and at least one of the connection portions of one closure part is rotatable relative to the anti-rotation portion of said closure part.

As a result of the non-rotatable connection, the anti-rotation portions as well as all the parts rigidly connected thereto maintain a constant relative position with respect to one another during the screw-connecting of the connection portions, in particular with reference to rotation around the closing direction. For example, the fastening of an electronic instrument to a carrier element (for example a bicycle handlebar) in a desired or predetermined alignment relative to the carrier element can be made simpler in this way. When the connection portions are screw-connected together, the electronic instrument can remain, for example, constantly in one position (with reference to rotation around the closing direction), which it assumes when placing the connection parts together.

In an advantageous embodiment, the anti-rotation portions are set up and arranged to prevent entrainment of at least one further part of the first closure part and/or of the second closure part.

Thus, for example, the first closure part can comprise a first fastening portion, which is connected to the first connection portion, for fastening the first closure part to a carrier element, the first fastening portion being connected to the at least one first anti-rotation portion so as to be non-rotatable with reference to rotation around the closing direction. For example, in this case, the first fastening portion can be realized for fastening the first closure part to a tubular carrier element, in particular to a bicycle handlebar. It is obviously also conceivable for the first fastening portion to be realized for fastening the first closure part to a different part of the bicycle frame other than the bicycle handlebars or for example to a motorbike handlebar. In principle, the closure device according to the invention can be realized and set up in particular for any type of fastener for fastening an object to a two-wheeler or thee-wheeler. This includes, along with use in an instrument fastener on a handlebar, among other things use for a pocket fastener on a bicycle, motorbike or trike.

In addition, in an advantageous embodiment the second closure part can comprise a second fastening portion, which is connected to the second connection portion, for fastening an object, for example an electronic instrument or a pocket, to the second closure part, the second fastening portion being connected to the at least one second anti-rotation portion so as to be non-rotatable with reference to rotation around the closing direction. The second fastening portion can be realized, for example, for fastening an electronic instrument, such as, for example, a mobile phone, in particular a smart phone, or another type of communication instrument, for example a navigation instrument or the like.

The first connection portion can be arranged so as to be rotatable around the closing direction relative to the at least one first anti-rotation portion. In addition to this or as an alternative to it, the second connection portion can be arranged so as to be rotatable around the closing direction relative to the at least one second anti-rotation portion. It is made possible in this way for the anti-rotation portions to be in non-rotatable engagement with one another when the connection portions are screw-connected by rotation around the closing direction.

In particular, on a second closure part which comprises a fastening portion, which is connected non-rotatably to the second anti-rotation portion for fastening an object, the second connection portion can be arranged so as to be rotatable around the closing direction relative to the at least one second anti-rotation portion. This allows the object to be secured to the second fastening portion in a predetermined or desired position with reference to rotation about the closing direction, irrespective of screw-connecting the connection portions together.

In particular, the second anti-rotation portion of the second closure part and/or the first anti-rotation portion of the first closure part can be realized by a separate component which is mounted on the associated fastening portion and is non-rotatably connected thereto. For example, a bayonet connection is provided for fixing an anti-rotation portion and a fastening portion together. In one variant, for mounting a closure part a separate component realizing the anti-rotation portion forms closure hooks which engage in an associated bayonet opening in the fastening portion when placed onto the fastening portion and latch with the same as a result of rotating the component relative to the fastening portion. For the latching with the fastening portion, said fastening portion realizes, for example, at its bayonet openings, in each case partially elastic latching lugs which, once the component has been rotated, engage behind a closure hook, which engages through the associated bayonet opening, and are secured in a positive locking manner in the bayonet opening.

According to an embodiment, the at least one first anti-rotation portion and/or the at least one second anti-rotation portion comprises a hollow cylindrical basic form which extends axially along the closing direction. As a result of its hollow cylindrical basic form, the anti-rotation portions can comprise a high degree of mechanical stability and at the same time be produced in a comparatively cost-efficient manner.

It is also within the framework of the invention that the anti-rotation portions are realized in such a manner that when the closure parts are positioned together, the at least one first anti-rotation portion surrounds the at least one second anti-rotation portion or the at least one second anti-rotation portion surrounds the at least one first anti-rotation portion at least in portions right around the closing direction. As a result of such an arrangement, a positive locking connection of the anti-rotation portions together and over and above this of the closure parts overall can be produced with reference to a radial movement with respect to the closing direction. This can contribute in an advantageous manner to the mechanical stability of the closure device in the positioned and in particular screw-connected state.

In a preferred manner, the at least one first anti-rotation portion and the at least one second anti-rotation portion are in positive locking engagement with one another to produce a non-rotatable connection when the connection portions are screw-connected.

In a further development the at least one first anti-rotation portion or the at least one second anti-rotation portion comprises at least one positive locking element which extends longitudinally along the closing direction. In addition, one anti-rotation portion of the other closure part comprises at least one recess which extends longitudinally along the closing direction for receiving the at least one longitudinally extending positive locking element. A mechanically more stable and reliable non-rotatable positive locking connection of the anti-rotation portions with one another can be achieved in this way. By means of the engaging of the positive locking element in a recess or the engaging of several positive locking elements in several recesses and a resultant locking of the respective positive locking element transversely with respect to the closing direction (and with respect to an axis of screw-connection or rotation of the closure device coinciding therewith), a non-rotatable connection between the anti-rotation portions is therefore produced.

A positive locking element and/or a recess can be formed at least in portions conically with respect to the closing direction. In one exemplary embodiment, several positive locking elements and the associated recesses are realized in each case conically and tapering in the closing direction. The positive locking elements are consequently realized in a wedge-shaped manner and, once the connection portions have been screw-connected correctly, are preferably also held in a non-positive locking manner in the recess. Once the connection portions have been screw-connected, an additional non-positive and positive locking component connection is provided in this manner for the interconnected closure parts by means of the positive locking elements and the recesses which receive the same.

In one variant several positive locking elements and/or recesses are provided. This includes, in particular, a variant where at least one positive locking element and at least one recess are both provided on one anti-rotation portion and in a manner corresponding thereto at least one recess and at least one positive locking element are provided on the other anti-rotation portion of the other closure part. This naturally also includes, however, developments where exclusively positive locking elements are provided on one anti-rotation portion of a closure part and exclusively recesses for said positive locking elements are provided on the other anti-rotation portion of the other closure part.

The positive locking elements and/or recesses are preferably provided spaced apart from one another about the closing direction along a peripheral line on the respectively associated anti-rotation portion. For a regular distribution of the loads arising and a positive locking, non-rotatable connection between the two anti-rotation portions in several relative positions about the closing direction, the positive locking elements and recesses, in this connection, are preferably spaced apart in an equidistant manner, e.g. where there are four positive locking elements, they are offset with respect to one another by in each case 90°.

In one possible development, the first connection portion and/or the second connection portion are formed conically with respect to the closing direction at least in portions. The first connection portion and the second connection portion are consequently not realized cylindrically with respect to the closing direction, but rather conically at least in portions, which can facilitate the placing of the connection portions together.

The connection portions can be formed, in this connection, in a conical manner at their threads or engagement elements or also on other surface portions which move into abutment against one another when the connection portions are placed in position.

In particular, on a side facing the other connection portion of the other closure part, threads of one or of both connection portions can be inclined at an angle to the closing direction and can consequently be realized in a conical manner In one embodiment, the at least one thread can comprise such a pitch that when the closure parts are placed together, on account of the magnetically attracting action of the magnet device, the at least one engagement element and the at least one thread run onto one another and the connection portions are automatically rotated with respect to one another around the closing direction. In this case, the connection portions are able to be screw-connected together in an automatic manner.

The engagement of the thread on the connection portion of the one closure part and of the engagement element on the other closure part is not self-locking in said embodiment. By placing the closure parts together in the closing direction, the thread of the one connection portion moves automatically into engagement with the engagement element of the other connection portion such that the connection portions and in addition the closure parts are automatically screwed together, brought about by the magnetic attraction between the closure parts, by rotating with respect to one another around the closing direction.

This produces, in this connection, a very simple fitting operation which only requires the user to place the parts (approximately) together. Meshing the closure parts mechanically by screw-connecting them together is effected automatically under the effect of the magnetic attraction of the magnet device, the magnet device being dimensioned correspondingly for this purpose.

For example, each closure part comprises a magnet element in the form of a permanent magnet which, when the closure parts are placed together, point to one another with opposite poles such that there is magnetic attraction between the magnet elements.

In one variant, at least one thread is also arranged on the other of the connection portions, the at least one thread including, in particular realizing, the at least one engagement element. For example, the at least one engagement element can be a projection which defines the at least one thread at least in portions.

According to a further variant, the connection portions comprise in each case at least one sliding surface and at least one blocking region in such a manner that the connection portions can be screw-connected along their sliding surfaces by rotation around the closing direction, when the two closure parts, mounted together, are pressed toward one another in the closing direction by a force, and in a connected state in which the connection portions are screw-connected together, rotation of the two connection portions with respect to one another about the closing direction is blocked by the blocking regions, located next to one another, when one of the connection portions is tensioned with a force which points away from the other closure part. This ensures that the closure device is not opened in an unwanted manner in the event of load, but is only able to be opened by a user in a conscious manner. For example, the in each case at least one sliding surface and/or the in each case at least one blocking region define a thread on the connection portions.

A blocking region can be realized, in this connection, for mechanically latching the two connection portions with one another, by means of which an unwanted or unintentional opening of the closure device is countered. For such a latching, the respective blocking region realizes, for example, latching recesses and/or latching lugs or hooks or latching toothing corresponding to DE 10 2013 213 633 A1, by means of which a positive locking blocking engagement of the two connection portions is possible in the case of a tensile load, in particular in the case of a tensile load acting in opposition to the closing direction on the second closure part which is positioned in the closing direction The blocking regions in one exemplary embodiment are realized and arranged in such a manner that, in the connected state of the closure parts, a slight rotation of the two connection portions relative to one another is allowed when a corresponding tensile load cooperates with at least one closure part before the blocking regions latch with one another in a positive locking manner. Thus, for screw-connection, the closure parts have to be pressed against one another in order to avoid latching over the blocking regions and to separate the closure parts from one another.

In a further development which is based thereon, the two connection portions are realized such that in a closed state of the closure device, they are screwed together in a play-free manner and consequently do not comprise any play along a connecting axis of the two connection parts parallel to the closing direction. The threads of the connection portions are preferably play-free in the screw-connected state for this purpose. Latching on the blocking regions, as a result of which the connection portions are blocked against rotation relative to one another when a tensile load acts along the connecting axis, is consequently only possible in such a realization variant after a slight rotation. Said rotation of one of the connection portions in a disengaging direction is then caused, in this connection, by means of the given tensile load and is allowed by means of the correspondingly chosen thread pitch or at least—in the case of a correspondingly high tensile load—made possible.

In one realization variant, the engagement element of the one connection portion or a thread realizing the same forms an end face which faces the other connection portion and is rounded and/or beveled with reference to the closing direction. As an alternative to this or in addition to it, a rounded and/or beveled end face with reference to the closing direction can be realized by a thread web which borders the at least one thread of the other connection portion. Providing a rounding or bevel, for example with a chamfer, on the end face, reduces the risk of the second closure part being positioned in an unfavorable relative position thereon with respect to the first closure part, in which automatic screw-connection as a result of the magnet device is blocked by the end face. The respective thread run-in is thus optimized in this manner in order to run the risk, if at all, only in a very small region, i.e. in a region making up only a fraction, for example, with reference to the overall extent of the connection portion, of the two connection portions not being automatically screwed together and after the second closure part has been placed onto the first closure part, the rotatable connection portion having to be rotated at least slightly manually until a screw-connection is no longer blocked by the end face. In a preferred manner, the rounded end face and/or the end face beveled with reference to the closing direction is realized in such a manner that a flat dead center region of the end face which extends transversely with respect to the closing direction, against which the connecting portion of the other closure part is able to abut and by way of which it is locked against displacement in the closing direction, comprises an extension length of less than 2 mm, in particular of less than 1 mm, along a peripheral line in the closing direction.

In one realization variant, the at least one connection portion, which is rotatable relative to the associated anti-rotation portion, is pre-tensioned in a direction of rotation in relation to said anti-rotation portion—preferably by means of at least one elastic element, for example a spring. The pre-tensioning is effected, in this connection, in a preferred manner in the direction in which the connection portion is rotated about the closing direction for screw-connecting the connection portions of the two closure parts. The screw-connecting of the two connection portions when the second closure part is placed onto the first closure part can be supported in this manner.

As an alternative to this or in addition to it, a locking device can be provided by means of which the at least one connection portion, which is rotatable relative to the associated anti-rotation portion, is locked in a predetermined relative position in relation to said anti-rotation portion when the two closure parts are separated from one another. The locking device can be actuatable by a magnetic force which is effective during or after the two closure parts are placed together—and which, for example, is from the magnet device or an additional magnetic element. Such a locking device can be combined advantageously with a pre-tensioned connection portion in order to disengage locking of the pre-tensioned, rotatable connection and to release the connection portion for rotation under the effect of a pre-tensioning force. Once the closure parts have been successfully separated from one another, one connection portion consequently remains locked in a pre-tensioned relative position which it has had to assume with reference to the anti-rotation portion in order to be able to disengage the connection portions from one another. On account of the triggering brought about by the magnetic force when the second closure part is placed onto the first closure part, the pre-tensioned connection portion—for example provided on the second closure part—is released and its rotation for screw-connecting the two connection portions and for closing the closure device is supported by the pre-tensioned force cooperating therewith.

In a further aspect, the invention relates to a handlebar fastener, in particular to a bicycle handlebar fastener or motorbike handlebar fastener, the handlebar fastener including a closure device according to the invention.

In addition, a fastener for an electronic instrument with a closure device according to the invention is proposed. The electronic instrument can be, for example, a mobile phone, in particular a smart phone. However, the electronic instrument can also be, for example, a navigation instrument or a different communication instrument or mobile terminal. The fastener for the electronic instrument can also be realized in this connection as a handlebar fastener. In particular, a smart phone fastener with a closure device according to the invention is proposed.

A fastener for fastening an object to a two-wheeler or three-wheeler, in particular in the form of a handlebar fastener, with a closure device according to the invention is additionally proposed. The object to be fastened can be, for example, an electronic instrument or a pocket.

BRIEF DESCRIPTION OF THE DRAWINGS

The concept underlying the invention is to be explained in more detail below by way of the exemplary embodiments shown in the Figures:

FIG. 1B shows a side view of the closure device; and

FIGS. 2A to 2C show exploded drawings of the closure device of FIGS. 1A to 1C;

FIGS. 5A to 5D show partially sectioned representations of the closure device in FIGS. 1A to 4B with an enlarged representation of two blocking regions on the threads of two closure parts of the closure device, by means of which unwanted disengagement of the closure parts and consequently opening of the closure device is able to be countered;

FIG. 6A shows a partially sectioned representation with an enlarged representation of two end faces in the inlet region of the two threads of the closure parts which, in the case of unfavorable contact, could block the closure device closing automatically;

FIG. 6B shows a further top view of the closure device in FIGS. 1A to 5D with representation of an intersecting line for the sectional representation in FIG. 6A;

FIGS. 7A to 7C show exploded drawings of a further realization variant of a closure device according to the invention without any blocking regions on the threads of the closure parts;

FIGS. 9A to 9B show views of the closure device in FIGS. 7A to 7C and 8A to 7B which concur with FIGS. 6A to 6B.

DETAILED DESCRIPTION

Figure 1A:
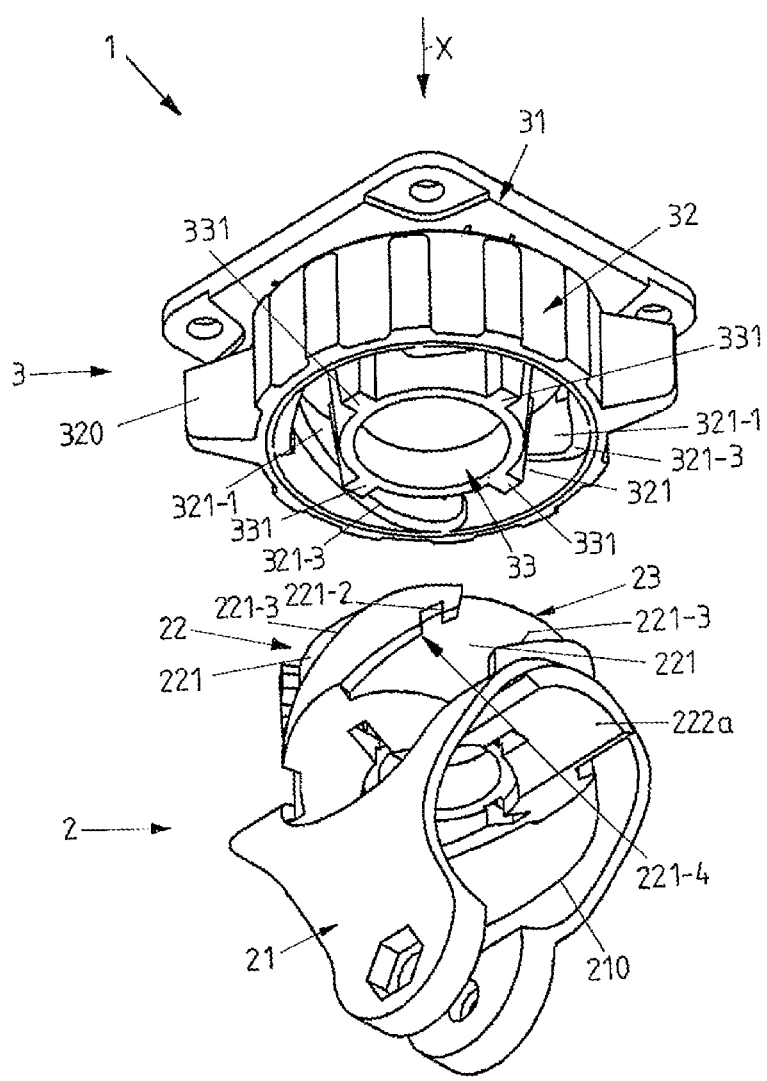
FIG. 1A shows a perspective view of a closure device with two closure parts which can be moved into threaded engagement with one another.
Figure 1C:
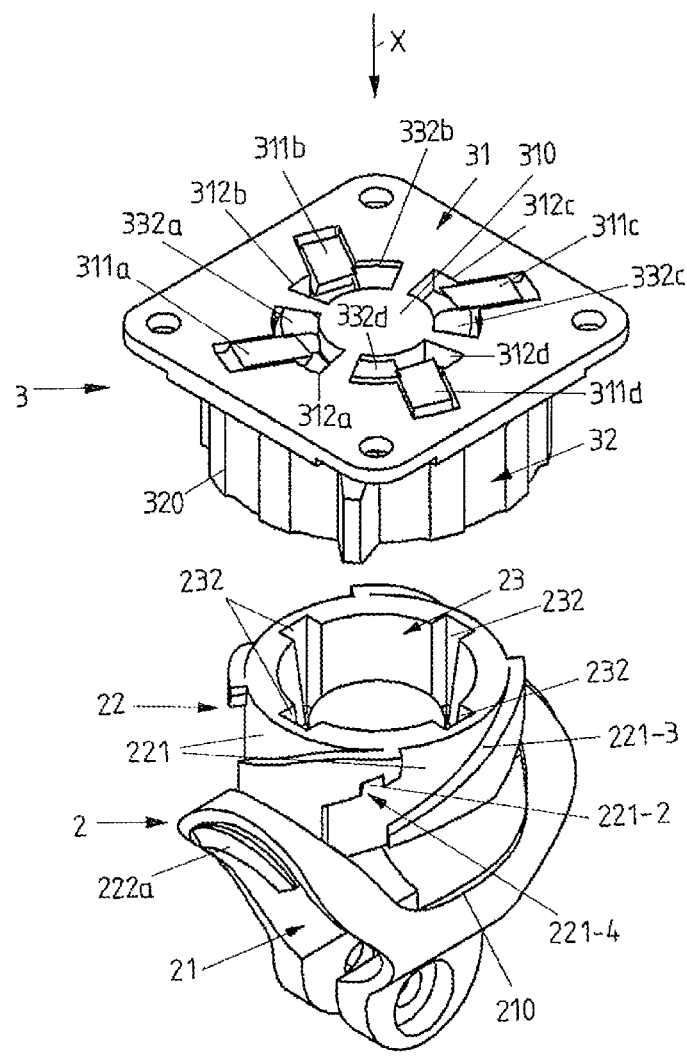
FIG. 1C shows a further perspective view of the closure device according to FIGS. 1A and 1B.
Figure 3C:
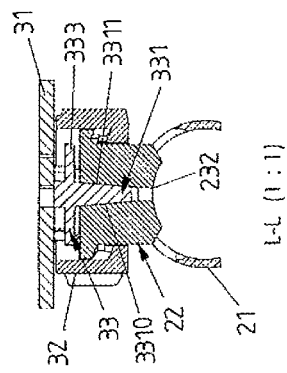
FIGS. 3B to 3C show sectional representations corresponding to the intersecting lines shown in FIG. 3A.
Figure 3A:
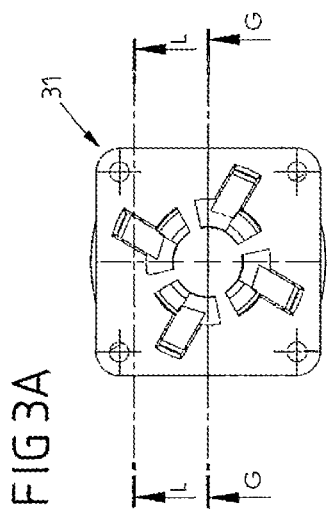
FIG. 3A shows a top view of the closure device of FIGS. 1A to 2C.
Figure 3B:
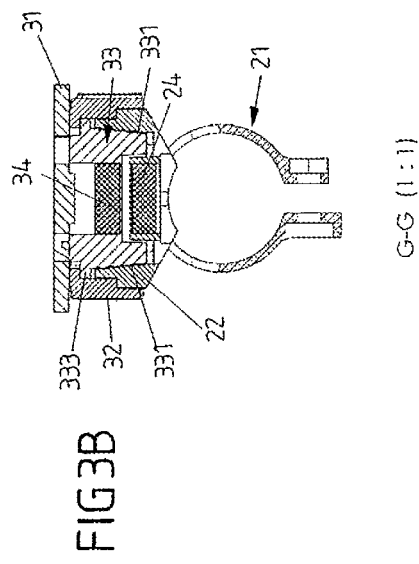

FIGS. 1A to 6B show various views of a closure device 1 which can be, for example, part of a handlebar fastener, in particular a bicycle handlebar fastener for fastening an electronic instrument, for example a smart phone. The closure device has a first closure part 2 and a second closure part 3, which can be moved into threaded engagement with one another for closing the closure device 1. For this purpose, the second closure part 3 is positionable in a closing direction X onto the first closure part 2 and is screw-connectable to said first closure part.

The screw-connecting of the second closure part 3 to the first closure part 2 is effected, in this case, by means of a first connection portion 22 which is provided on the first closure part 2 and a second connection portion 32 which is provided on the second closure part 3. In the exemplary embodiment shown, both connection portions 22, 32 comprise a hollow cylindrical basic form which extends axially along the closing direction X. In this case, compared to the first connection portion 22, the second connection portion 32 comprises a larger radius with reference to the closing direction X such that, when the second closure part 3 is placed correctly onto the first closure part 2, the second connection portion 32 surrounds the first connection portion 22 at least in portions around the closing direction X. The second connection portion 32 additionally defines a gripping region 320, which can be gripped comfortably by a user with at least two fingers in order to unscrew the second connection portion to open the closure device 1.

First threads 221 are realized on an outer lateral surface of the first connection portion 22. In a complementary manner to this, second threads 321 are realized on an inside lateral surface of the second connection portion 32 in such a manner that the connection portions 22, 32, when rotated with respect to one another around the closing direction X, are screw-connectable together as a result of the second thread 321 running onto the first thread 221.

In the exemplary embodiment shown, projections, which are realized on the inside lateral surface of the second connection portion 32 and define the second threads 321, consequently form engagement elements 321-1 which run onto the first threads 221 for screw-connecting the connection portions 22, 32 together. However, other variants are also conceivable where at least one engagement element 321-1 is realized in another manner on the second connection portion 32. For example, an engagement element 321-1 can be provided in the form of at least one projection which is realized on the inside lateral surface of the second connection portion 32, the at least one projection only extending in portions along a periphery of the inside lateral surface.

As an alternative to the hollow cylindrical form of the connection portions 22, 23 shown in FIGS. 1A to 6B and to the threads 221, 321 realized thereon, embodiments are conceivable where at least one of the connection portions 22, 23 and/or of the threads 221, 321 are formed at least in portions conically with respect to the closing direction X. This can facilitate placing the closure parts 2, 3 together.

At least one anti-rotation portion 23, 33 is additionally provided according to the invention on each of the closure parts 2, 3, the anti-rotation portions 23, 33 being realized and arranged in such a manner that, when the connection portions 22, 32 are screw-connected together, the first anti-rotation portion 23 is in non-rotatable engagement with the second anti-rotation portion 33 with reference to rotation around the closing direction X.

As a result, the first anti-rotation portion 23 and the at least one second anti-rotation portion 33 are non-rotatably connected together when the connection portions 22, 32 are screw-connected.

The second anti-rotation portion 33 on the second closure part 3 comprises a hollow cylindrical basic form which extends axially along the closing direction X, a radius of the hollow cylindrical basic form of the second anti-rotation portion 33 being smaller than a radius of the hollow cylindrical basic form of the second connection portion 32. The second anti-rotation portion 33 is arranged coaxially with respect to the second connection portion 32 on the second closure part 3 and is surrounded in part by said second closure part.

In this case, the second connection portion 32 is arranged on the second closure part 3 so as to be rotatable around the closing direction X relative to the second anti-rotation portion 33. For example, the second connection portion 32 can be mounted in such a manner on an under surface of a substantially flatly extending second fastening portion 31, which is realized for fastening an electronic instrument to the second closure part 3, that it is possible to rotate the second connection portion 32 around the closing direction X relative to the anti-rotation portion 33. In the present case, the second connection portion 32 is connected in a positive locking manner to the fastening portion 31 by means of the second anti-rotation portion 33 and in particular by means of a fastening collar 333 realized thereon and is held rotatably on the fastening portion 31. In this case, the second anti-rotation portion 33 is itself fixed non-movably on the fastening portion 31 and is non-rotatably connected to the second fastening portion 31. Consequently, an electronic instrument, for example a smart phone which can be rigidly connected to the second fastening portion 31, is also connected to the second anti-rotation portion 33 so as to be non-rotatable with reference to rotation around the closing direction X.

Four positive locking elements 331, which extend longitudinally along the closing direction X, are arranged on an outer lateral surface of the second anti-rotation portion 33, in each case offset by 90° with respect to one another. Four recesses 232, which are each offset by 90° with respect to one another and extend longitudinally along the closing direction X, are realized in a complementary manner to said positive locking elements on an inner lateral surface of the first connection portion 22, which forms the second anti-rotation portion 23, for receiving the positive locking elements 331. When the closure parts 2, 3 are placed correctly on one another, the positive locking elements 331 are inserted into the receiving means 232. In this case, the positive locking elements 331 engage in the recesses 232 such that, with reference to rotation around the closing direction X, there is a non-rotatable positive locking connection between the anti-rotation portions 23, 33. When the connection portions 22, 32 are subsequently screw-connected together, the second anti-rotation portion 33 surrounds the first anti-rotation portion 23 all around the closing direction X.

The first closure part 2 comprises a first fastening portion 21, which is connected to the first connection portion 22, for fastening the first closure part 2 to a carrier element. In the exemplary embodiment shown, the first fastening portion 21 is realized as a clip in the manner of a bicycle handlebar fastener known per se for fastening the first closure part 2 to a tubular carrier element, in particular to a bicycle handlebar or motorbike handlebar. In this case, the first fastening portion 21 is connected to the first anti-rotation portion 23 by means of the first connection portion 22 so as to be non-rotatable with reference to rotation around the closing direction X. As a result of the non-rotatable connection to one another, the anti-rotation portions 23, 33 and the fastening portions 21, 31 non-rotatably connected thereto as well as all the parts rigidly connected thereto maintain a constant position with respect to one another with reference to rotation around the closing direction X during the screw-connecting of the connection portions 22, 32 with one another. In this way, for example the fastening of a smart phone to a bicycle handlebar in an alignment adapted to a direction of vision of a cyclist relative to the bicycle handlebar can be facilitated.

A magnet device 24, 34, which when the closure parts 2, 3 are placed together acts in a magnetically attracting manner between the first closure part 2 and the second closure part 3, is additionally provided on the closure device 1. To this end, each closure part 2, 3 comprises a magnet element 24, 34 in the form of a permanent magnet which, when the closure parts 2, 3 are placed together, point to one another with opposite poles such that there is a magnetic attraction in the closing direction X between the magnet elements 24, 34.

As shown in FIG. 2, a first magnet element 24 can be arranged, for example, in a bottom region of the first connection portion 22. For example, several first magnet elements 24 can also be arranged in a bottom region of the first connection portion 22 symmetrically with reference to an axis of the hollow cylindrical basic form of the first connection portion 22. A second magnet element 34 can be inserted, for example, centrally into the first fastening portion 31 on the second closure part 3 in such a manner that when the second closure part 3 is placed correctly onto the first closure part 2, a resultant magnetic attraction acts in the closing direction X between the first magnet elements 24 and the second magnet element 34. In a variant, several second magnet elements 34 can also be arranged in a bottom region of the second anti-rotation portion 33. For example, four second magnet elements 34 can be arranged in each case in a bottom region of the four positive locking elements 331. The magnet elements 24, 34 can be cast, for example, into the closure parts 2, 3.

In the exemplary embodiment shown, the threads 221, 321 of the connection portions 22, 32 of the two closure parts 2, 3 comprise such a pitch α that when the closure parts 2, 3 are placed together, the second thread 321, on the one side, and the first thread 221, on the other side, run onto one another on account of the magnetic attraction of the magnet device 24, 34. As a result, the second connection portion 32, with the first closure part 2 locked, is rotated automatically around the closing direction X relative to the first and second anti-rotation portions 23, 33 which are connected together in a positive locking manner. A corresponding pitch angle α of the first thread 221 is shown in FIG. 2. The pitch angle α, which a first sliding surface 221-3, for the sliding run-up of an engagement element 321-1 of the second connection portion 32, encloses with the perpendicular in a closing direction X, can be, for example, at least 10°, at least 15°, at least 20°, or even more than 30°, in order to enable the connection elements 22, 32 to run-up automatically onto one another and rotate with one another.

The meshing of the threads 221, 321 is not self-locking in said embodiment. By placing the closure parts 2, 3 together in the closing direction X, the second thread 321 automatically moves into engagement with the first thread 221 such that the connection portions 22, 32 and additionally the closure parts 2, 3 are automatically screw-connected together, brought about by the magnetic attraction between the closure parts 2, 3, by rotating relatively to one another around the closing direction X. In this case, a very simple initial operation is produced which requires the user simply to place the closure parts 2, 3 together (roughly). The mechanical meshing as a result of the closure parts 2, 3 being screw-connected together is effected automatically under the effect of the magnetic attraction of the magnet device 24, 34. The magnet device 24, 34 is dimensioned correspondingly for this purpose.

In addition, a thread of the first closure part 2, as shown in detail in FIGS. 5A to 5D, also comprises in each case, along with the sliding surfaces 221-3, at least one blocking region 221-4 located opposite a first sliding region 221-3. In this case, a latching recess 221-2 is realized in each case on the blocking region 221-4. On the thread of the second closure part 3, along with the sliding surfaces 321-3, at least one second blocking region 321-4, which corresponds with the first blocking region 221-4 of the first closure part 2, is realized located opposite a second sliding surface 321-3. A second blocking region 321-4 comprises, in this case, a latching lug 321-5 which is complementary to the first latching recess 221-2 such that the connection portions 22, 32 are mechanically latchable to one another by means of the blocking regions 221-4 and 321-4. In order to obtain sturdier latching of the blocking regions 221-4 and 321-4 together, the first blocking region 221-4, in addition to the latching recess 221-2, also comprises a latching lug 221-5 which is provided for engagement in a latching recess 321-2 of the other blocking region 321-4.

The latching lugs 221-5 and 321-5 are realized, for example, as projections on the second blocking regions 221-4 and 321-4 which, once the connection portions 22, 32 have been screw-connected, can be moved alternately into engagement with the latching recesses 321-2 and 221-2 of the respectively other connection portion 32 or 22. In this case, the connection portions 22, 32 are rotatable around the closing direction X with respect to one another along their sliding surfaces 221-3, 323-3 when the two closure parts 2, 3 that have been placed together are pressed together in the closing direction by a force K. The force K can be provided, for example, by the magnetic attraction of the magnet device 24, 34 when the closure parts 2, 3 are placed together. In contrast, rotation of the two connection portions 22, 32 with respect to one another about the closing direction X is blocked by the abutting blocking regions 221-4 of the first connection portion 22, on the one side, and of the second connection portion 32, on the other side, when the blocking regions 221-4 and 321-4 are latched together and the two connection portions 22, 32 are tensioned, i.e. in particular when the second closure part 3 is tensioned in opposition to the closing direction X. For example, when the sliding surfaces 221-3, 321-3 run onto one another, a certain play is provided between the blocking regions 221-4 of the first connection portion 22 (located opposite one another in this case), on the one side, and of the second connection portion 32, on the other side, such that the oppositely located blocking regions 221-4 and 321-4 only abut against one another, and in particular the latching recesses 221-2, 321-2 and latching lugs 321-5, 221-5 realized on the respective blocking regions 221-4, 321-4 only latch alternately with one another, following the connection portions 22, 32 being tensioned against one another in opposition to the closing direction X. In this way, unintentional disengagement of the screw-connection of the connection portions 22, 32 can be avoided by tensioning the closure parts 2, 3 or the parts arranged thereon (e.g. smart phone and bicycle handlebar) together along the closing direction X.

As is illustrated in particular by way of the exploded drawings in FIGS. 2A, 2B and 2C, each of the closure parts 2 and 3 of the closure device 1 is realized in multiple parts, i.e. is formed by several separately produced and interconnected parts. Thus, the first closure part 2, along with the clip which forms the fastening portion 21, comprises a connection body which is secured thereon and, among other things, realizes the cylindrical connection portion 22. Said connection body is fixed to the first fastening portion 21 by means of fixing flanges 222a and 222b, which project in a radial manner transversely with respect to the closing direction X and extend in a diametrically opposed manner. For this purpose, the fixing flanges 222a and 222b engage behind edge portions of the first fastening portion 21 which border a bearing opening 210. Said bearing opening 210 is realized on a top surface of the first fastening portion 21 and serves for receiving part of the connection body such that the first connection portion 22 is able to extend right through said bearing opening 210. Elastic screw tabs are provided in a manner known per se on a bottom surface of the clip in order to be able to fix the clip to a handlebar.

The connection body for the first connection portion 22 additionally comprises another bearing portion 223 for the first magnet element 24. In the present exemplary embodiment, the bearing portion 223 comprises a central opening for this purpose into which a disk-shaped first magnet element 24 is able to be inserted.

The second closure part 3 includes, among other things, a base part which realizes the second anti-rotation portion 33 and is connected non-rotatably to the disk-shaped second fastening portion 31. The second connection portion 32 of the second closure part 3 is rotatably held on the second fastening portion 31 by means of said base part. For this reason, the base part comprises on its top side several, in the present case four, closure hooks 332a, 332b, 332c and 332d as well as a radially projecting fastening collar 333 which runs around the direction of flow X. The closure hooks 332a to 332d are inserted into bayonet openings 312a, 312b, 312c and 312d of the second fastening portion 31 and are locked in a positive locking manner in said openings. The bayonet openings 312a to 312d, in this case, are grouped about a central core 310 of the second fastening portion and are arranged, in this case, next to one another along a circular line about the closing direction X.

Once the base part has been correctly fixed to the second fastening portion 31, a circular gap remains between the fastening collar 333 and a bottom surface of the second fastening portion 31. Radially inwardly projecting webs of the hollow cylindrical second connection portion 32 engage in said circular gap such that said webs are received in a positive locking manner between the fastening collar 333 and the second fastening portion 31. As a result of this, the second connection portion 32 is then held so as to be rotatable about the closing direction X and about a connecting axis, which is parallel thereto, on the second fastening portion 31 and on the base part which realizes the second anti-rotation portion 33.

To fix the base part to the second fastening portion, latching lugs 311a, 311b, 311c and 311d are provided on the second fastening portion 31 in addition to the bayonet openings 312a to 312d, said latching lugs being assigned in each case to one of the bayonet openings 312a to 321d. The individual latching lugs 311a to 311d are each mounted in an elastic manner. As a result, once a closure hook 332a to 332d has been inserted into the respective bayonet opening 312a to 312d, they allow the respective closure hook 332a to 332d to be guided past a radially inside end of the respective latching lug 311a to 311d and the base part and the second fastening portion 31 to be rotated relative to one another (e.g. in the case of the exemplary embodiment shown, by the base part being rotated clockwise in top view). Once the base part and the second fastening part 31 have been rotated relative to one another such that the closure hooks 332a to 332d inside the respectively assigned bayonet opening 312a to 312d are displaced into a region with smaller dimensions, the closure hooks 332a to 332d latch with the latching lugs 311 a to 311d and are engaged behind by said latching lugs. The base part, which realizes the second anti-rotation portion 33, is locked on the second fastening portion 31 by means of the bayonet connection in such a manner and is thereby non-rotatably connected.

FIGS. 3A, 3B and 3C once again illustrate in detail the cone form of the web-shaped, radially projecting positive locking elements 331 of the second anti-rotation portions 33 as well as the cone form of the correspondingly formed, longitudinally extending recesses 232 of the first anti-rotation portion 23. The positive locking elements 331 and the recesses 232 each taper, in this case, in the closing direction X in order, once the two connection portions 22, 32 have been screw-connected together, to mesh with one another in an almost tolerance-free manner. The positive locking elements 331, which are wedge-shaped in the side view or in the sectional view corresponding to FIG. 3C, comprise, in this connection, two contact surfaces 3310 and 3311 which are remote from one another in the circumferential direction and abut against the inside walls of the associated recess 232 in a non-positive locking manner.

FIGS. 4A to 4B and 5A to 5D illustrate in detail the interaction between the blocking regions 221-4, 321-4 of the first and second connection portions 22, 32. By means of the blocking regions 221-4, 321-4, both connection portions 22, 32 remain locked together in the event of a tensile load and the closure device 1 is secured against unintentional separation of the two closure parts 2, 3 from one another without, in this connection, impairing the simple smooth-running screw-connection of the two connection portions 22, 32 and the automatic closing of the closure device 1.

Figure 4A:
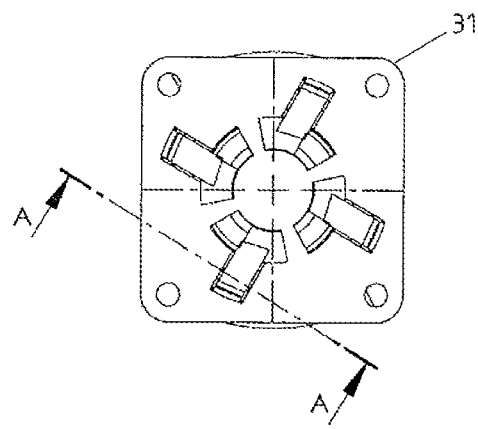
FIG. 4A shows a top view of the closure device in FIGS. 1A to 3C.
Figure 4B:
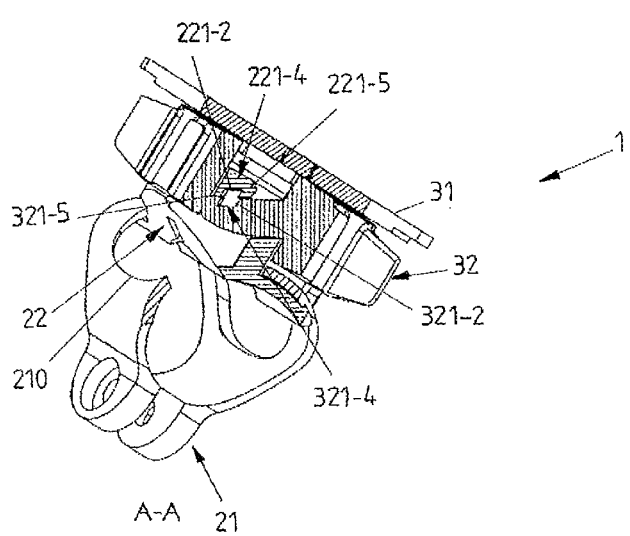
FIG. 4B shows a sectional representation corresponding to the intersecting line shown in FIG. 4A.
Figure 8A:
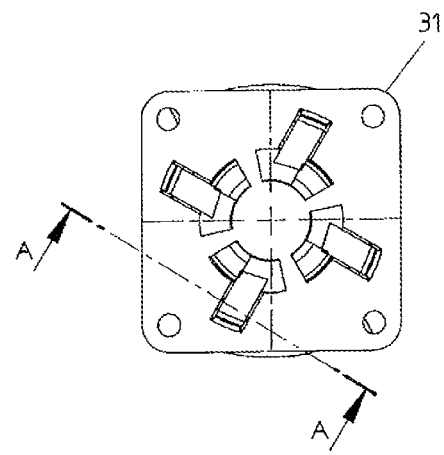
FIGS. 8A to 8B show views of the closure device in FIGS. 7A to 7C which concur with FIGS. 4A and 4B.
Figure 8B:
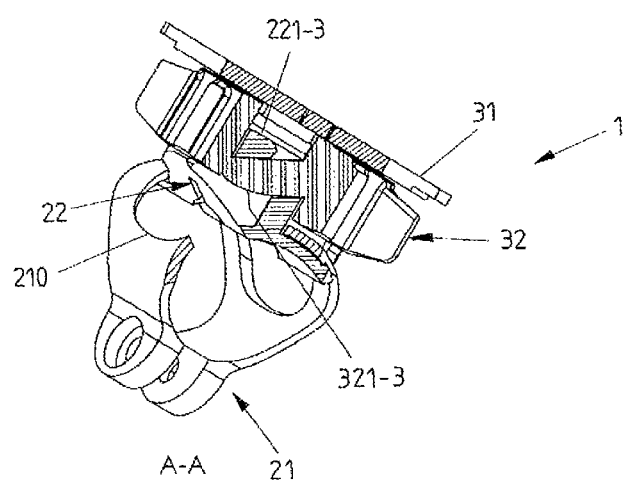

FIGS. 4B and 5A, in this case, show a connected state of the two closure parts 2, 3 in which the respective threads mesh in a play-free manner and the latching recesses 221-2 and 321-2 of the two connection portions 22, 32 are located opposite one another. The blocking regions 221-4, 321-4, in this connection, corresponding to the representations in FIG. 5B, do not mesh alternately by means of the latching lugs 221-5, 321-5 and latching recesses 221-2, 321-2 until the second connection portion 32 has been rotated slightly relative to the first connection portion 22 by a tensile force which cooperates with the second closure part 3, in the direction of rotation in which the second connection portion 32 normally has to be rotated in order to separate the two closure parts 2, 3 from one another. If, therefore, the second closure part 3 is pulled away from the other closure part 2, separation of the closure parts 2, 3 from one another is not possible on account of the latching on the blocking surfaces 221-4 and 321-4 and their mutual latching.

The unscrewing of the connection portions 22, 32 and the complete disengagement of the closure parts 2, 3 from one another, as is illustrated in FIGS. 5C and 5D, is only possible rather by the two closure parts 2, 3 being pressed against one another or at least the second closure part 3—preferably still connected to the mobile instrument—being pressed in the direction of the first closure part 2.

In order, when placing the second closure part 3 onto the first closure part 2, to keep as small as possible a dead center region t, in which automatic screwing-in of the second connection portion 32 is blocked by abutting end faces of the thread of the two connection portions 22, 32, end faces 221-6 and 321-6 on the thread inlets facing the respectively other connection portion along the connecting axis are preferably rounded or beveled corresponding to FIGS. 6A and 6B.

In the present case, as a result of providing rounded end faces 221-6 and 321-6 on the thread webs of the threads of the first and second connection portions 22, 32, a dead point region t with a width of less than 1 mm is obtained. The probability, when placing the second closure part 3 onto the first closure part 2 of the closure device 1, of an automatic screwing-in being blocked by the thread webs which contact one another in an axial manner and of the thread web of the second connection portion 32 not sliding into the first thread 221-2 of the first connection portion 22, is consequently reduced to a minimum.

A second realization variant of a closure device 1 according to the invention is illustrated by way of exploded drawings 7A, 7B, 7C and the views of FIGS. 8A to 8B and 9A to 9B which coincide with FIGS. 4A to 4B and 6A to 6B. In the case of said variant, elements which coincide with the realization variant of FIGS. 1A to 6b are characterized with the same references. In contrast to the closure device 1 in FIGS. 1A to 6B, the closure device 1 in FIGS. 7A to 9B simply does not comprise any blocking regions 221-4, 321-4 which are latchable together, by means of which the closure device 1 is blocked against unwanted opening. Apart from this, the structural details all coincide.

In principle, the second connection portion 32, in the case of the exemplary embodiments shown, can be pre-tensioned in the closing direction relative to the anti-rotation portion 33 of the second closure part 3—for example, by means of a spring. As a result, the screw-connecting of the two connection portions 22, 32 is able to be supported when the second closure 3 is placed onto the first closure part 2.

A locking device is preferably provided additionally on the second closure part 3, by means of which the rotatable connection portion 32 is locked in relation to its anti-rotation portion 33 in a predetermined relative position about the closing direction X when the two closure parts 2, 3 have been separated from one another. The locking device, in this connection, can be magnetically actuatable such that the connection portion 32 is released by a magnetic force which is effective during or after the two closure parts 2, 3 have been placed together and is rotated in the closing direction under the restoring force of a spring element. If the second connection portion 32 of the second closure part 3 is unscrewed for opening the closure device 1, as a result it assumes the relative position with respect to the anti-rotation portion 33 in which it is automatically stopped by the locking device until the two closure parts 2, 3 are placed together again.

LIST OF REFERENCES

1 Closure device
2 First closure part
21 First fastening portion
210 Bearing opening
22 First connection portion
221 First thread
221-2 First latching recess
221-3 First sliding surface
221-4 First blocking region
221-5 Latching lug
221-6 Rounded end face
222a, 222b Fixing tab
223 Bearing portion
23 First anti-rotation portion
232 Recess
24 First magnet element
3 Second closure part
31 Second fastening portion
310 Core
311a-311d Latching lug
312a-312d Bayonet opening
32 Second connection portion
320 Gripping region
321 Second thread
321-1 Engagement element
321-2 Latching recess
321-3 Second sliding surface
321-4 Second blocking region
321-5 Latching lug
321-6 Rounded end face
33 Second anti-rotation portion
331 Positive locking element
3310, 3311 Contact surface
332a-332d Closure hook
333 Fastening collar
334 Bearing portion
34 Second magnet element
K Force
t Dead center region
X Closing direction
α Pitch angle

The invention claimed is:

1. A closure device for fastening an object to a carrier element, said closure device having
a first closure part which comprises a first connection portion,
a second closure part which comprises a second connection portion and is mountable onto the first closure part in a closing direction and
a magnet device which, when the closure parts are placed together, acts in a magnetically attracting manner between the first closure part and the second closure part,
wherein at least one thread is arranged on one of the connection portions and at least one engagement element is arranged on the other of the connection portions, and the connection portions are screw-connectable together by rotation with respect to one another around the closing direction as a result of the at least one engagement element running onto the at least one thread,
wherein
the first closure part includes at least one first anti-rotation portion and the second closure part includes at least one second anti-rotation portion, wherein the at least one first anti-rotation portion and the at least one second anti-rotation portion are non-rotatably connected together when the connection portions are screw-connected, and at least one of the connection portions of one closure part is rotatable relative to the anti-rotation portion of said closure part.

2. The closure device according to claim 1, wherein the first connection portion is arranged so as to be rotatable around the closing direction relative to the at least one first anti-rotation portion or in that the second connection portion is arranged so as to be rotatable around the closing direction relative to the at least one second anti-rotation portion.

3. The closure device according to claim 1, wherein the at least one first anti-rotation portion and the at least one second anti-rotation portion are in positive locking engagement with one another to produce a non-rotatable connection when the connection portions are screw-connected.

4. The closure device according to claim 3, wherein at least one anti-rotation portion of a closure part comprises at least one positive locking element which extends longitudinally along the closing direction and one anti-rotation portion of the other closure part comprises at least one recess which extends longitudinally along the closing direction for receiving the at least one longitudinally extended positive locking element.

5. The closure device according to claim 4, characterized in wherein the positive locking element and/or the recess is formed conically with respect to the closing direction at least in portions.

6. The closure device according to claim 4, wherein there are provided several positive locking elements or recesses which are spaced apart from one another, along a peripheral line about the closing direction on the associated anti-rotation portion.

7. The closure device according to claim 1, wherein the at least one thread comprises such a pitch that when the closure parts are placed together, on account of the magnetically attracting action of the magnet device, the at least one engagement element and the at least one thread run onto one another and the connection portions are automatically rotated with respect to one another around the closing direction.

8. The closure device according to claim 1, wherein at least one further thread, which realizes the at least one engagement element, is arranged on the other of the connection portions.

9. The closure device according to claim 8, wherein the threads of the connection portions of the two closure parts are realized and matched to one another in such a manner that in a connected state in which the connection portions are screw-connected together, the threads mesh in a play-free manner.

10. The closure device according to claim 1, wherein the engagement element realizes an end face which faces the other connection portion and is rounded or beveled with reference to the closing direction and/or the at least one thread is bordered by a thread web with an end face which faces the other connection portion and is rounded or beveled with reference to the closing direction.

11. The closure device according to claim 10, wherein the rounded end face or the end face beveled with reference to the closing direction is realized in such a manner that a flat dead center region of the end face, which extends transversely with respect to the closing direction and against which the connecting portion of the other closure part is able to abut and by means of which it is blocked against displacement in the closing direction, comprises an extension length of less than 2 mm along a peripheral line about the closing direction.

12. The closure device according to claim 1, wherein the connection portions comprise in each case at least one sliding surface and at least one blocking region in such a manner that the connection portions are screw-connectable together along their sliding surfaces as a result of rotation around the closing direction, when the two connection portions fitted together are pressed together in the closing direction by a force and in a connected state in which the connection portions are screwed together, a rotation of the two connection portions with respect to one another about the closing direction is blocked by the blocking regions, located next to one another, of the first connection portion and of the second connection portion, when a tensile force, which points away from one of the connection portions, acts on the other of the connection portions.

13. The closure device according to claim 1, wherein the at least one connection portion, which is rotatable relative to the associated anti-rotation portion, is pre-tensioned in relation to said anti-rotation portion in a direction of rotation.

14. The closure device according to claim 1, wherein a locking device is provided by means of which the at least one connection portion, which is rotatable relative to the associated anti-rotation portion, is locked in a predetermined relative position in relation to said anti-rotation portion, when the two closure parts are separated from one another.

15. The closure device according to claim 13, wherein the locking device is actuatable by a magnetic force which is effective during or after the two closure parts are placed next to one another in order to disengage a locking of the pre-tensioned, rotatable connection portion and to release the connection portion for rotation under the effect of a pre-tensioning force.

16. The closure device according to claim 1, wherein the first closure part comprises a first fastening portion which is connected to the first connection portion for fastening the first closure part to the carrier element, wherein the first fastening portion is non-rotatably connected to the at least one first anti-rotation portion.

17. The closure device according to claim 16, wherein the first fastening portion is realized for fastening the first closure part to a tubular carrier element, in particular to a bicycle handlebar.

18. The closure device according to claim 1, wherein the second closure part comprises a second fastening portion which is connected to the second connection portion for fastening an electronic instrument to the second closure part, wherein the second fastening portion is non-rotatably connected to the at least one second anti-rotation portion.

19. A fastener for fastening an object to a two-wheeler or three-wheeler having a closure device according to claim 1.

20. A fastener for fastening an electronic instrument to a carrier element, having a closure device according to claim 1.

* * * * *

UNITED STATES PATENT AND TRADEMARK OFFICE
CERTIFICATE OF CORRECTION

PATENT NO. : 10,179,548 B2  
APPLICATION NO. : 15/238080  
DATED : January 15, 2019  
INVENTOR(S) : Joachim Fiedler et al.

Page 1 of 1

It is certified that error appears in the above-identified patent and that said Letters Patent is hereby corrected as shown below:

In the Claims

Column 16, Lines 38-39, Claim 5, after "claim 4," delete "characterized in"

Column 16, Line 44, Claim 6, delete "another," and insert -- another --

Signed and Sealed this  
Seventh Day of May, 2019

Andrei Iancu  
*Director of the United States Patent and Trademark Office*